United States Patent [19]

Herndon

[11] Patent Number: 4,592,523

[45] Date of Patent: Jun. 3, 1986

[54] EJECTION SEAT RESTRAINT SYSTEM FOR LIMBS AND HEAD

[75] Inventor: Gerald F. Herndon, Bellevue, Wash.

[73] Assignee: The Boeing Company, Seattle, Wash.

[21] Appl. No.: 655,922

[22] Filed: Sep. 28, 1984

[51] Int. Cl.⁴ .............................................. B64D 25/06
[52] U.S. Cl. .............................. 244/122 AG; 297/216; 297/466; 280/733; 280/749
[58] Field of Search ....... 244/122 R, 122 A, 122 AG, 244/122 B, 121; 297/464–468, 487–488, 474, 475, 216; 269/328; 128/133, 134; 280/808, 748, 728, 730, 733, 749, 753, 729

[56] References Cited

U.S. PATENT DOCUMENTS

| | | | |
|---|---|---|---|
| 2,955,786 | 10/1960 | Drew et al. | 244/122 |
| 3,188,139 | 6/1965 | Boyce | 297/384 |
| 3,214,117 | 10/1965 | James et al. | 244/122 |
| 3,249,385 | 5/1966 | Boyce et al. | 297/384 |
| 3,271,797 | 9/1966 | Boyce | 5/348 |
| 3,287,064 | 11/1966 | Freeman | 297/390 |
| 3,302,633 | 2/1967 | Vykukal | 128/1 |
| 3,329,464 | 7/1967 | Barwood et al. | 297/389 |
| 3,836,168 | 9/1974 | Nonaka et al. | 244/122 AC UX |
| 3,957,231 | 5/1976 | Miller et al. | 244/122 |
| 4,081,156 | 3/1978 | Ideskär | 244/122 |
| 4,179,086 | 12/1979 | Yamada | 244/122 |
| 4,215,835 | 8/1980 | Wedgwood | 244/122 |
| 4,247,064 | 1/1981 | Schulman et al. | 244/122 |
| 4,301,983 | 11/1981 | Horan | 244/122 |
| 4,359,200 | 11/1982 | Brevard et al. | 244/122 |
| 4,436,262 | 3/1984 | Cummings | 244/122 AG |

FOREIGN PATENT DOCUMENTS 1008477  10/1965  United Kingdom ............... 244/122

Primary Examiner—Galen L. Barefoot
Attorney, Agent, or Firm—Joan H. Pauly

[57] ABSTRACT

During ejection from a high performance aircraft, high wind blast conditions create danger of injuries caused by the flailing of limbs out of their desired positions. The invention provides a system that restrains the arms, legs, and head with one simple mechanism. A side net (28) and a knee strap (40) are attached to each of two center straps (22). Straps (22) extend forwardly from seat (2) to a tension fuse fitting (46) and down to snubbers (48). Deployment of straps (20, 40) and nets (28) is initiated by an inflatable member (20) that projects horizontally forwardly over the helmet (100) of the seat occupant. Deployment is completed by tensioning of straps (22) by upward movement of seat (2). When straps (22) reach a given tension, fittings (46) release straps (22) which drop down between the knees of the occupant. As straps (22) are further tensioned, nets (28) are pulled snugly around the front of the occupant, knee straps (40) are pulled snugly around the lower legs of the occupant, and member (20) is urged downwardly against the occupant's helmet (100).

17 Claims, 9 Drawing Figures

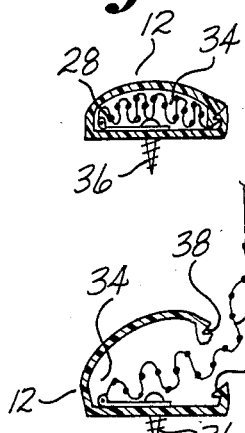
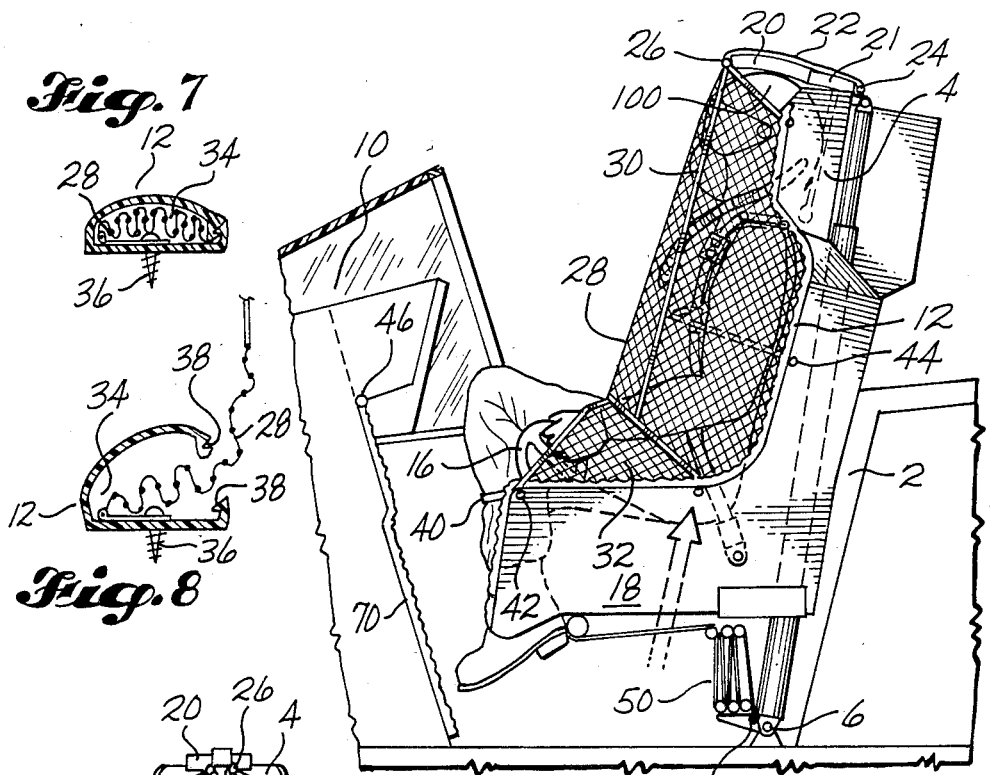
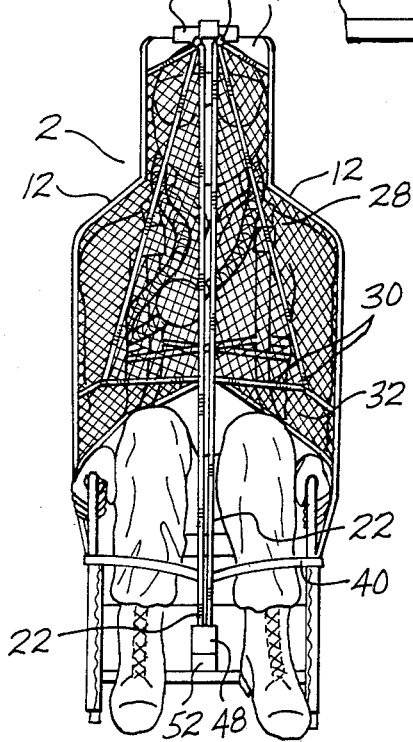
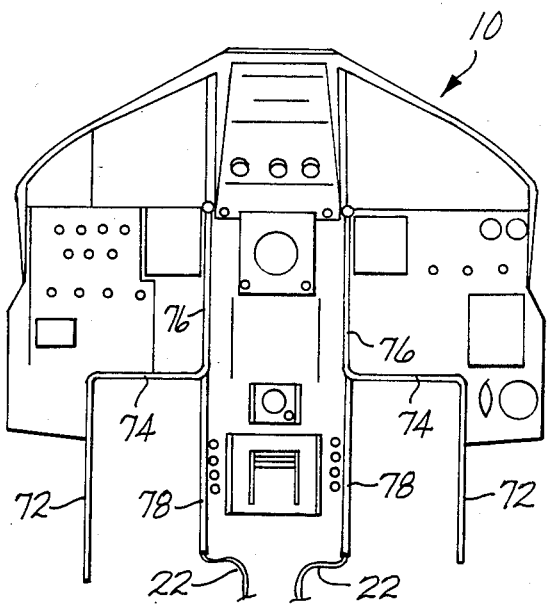

EJECTION SEAT RESTRAINT SYSTEM FOR LIMBS AND HEAD

DESCRIPTION

1. Technical Field

This invention relates to methods and apparatus for restraining portions of the body of an occupant of an ejection seat during ejection and, more particularly, to such a method and apparatus in which head, arm, and leg restraints and a helmet retainer are combined in one device, in which deployment of side nets and center straps is initiated by projecting the helmet retainer forwardly above the occupant's head, and in which the straps are guided through tension fittings located to drop them between the occupant's knees.

2. Background Art

A number of commonly known problems are associated with the ejection of a person from a high performance aircraft. These problems include injuries and deaths resulting from the limbs of the occupant of the ejection seat becoming dislodged from their desired positions and flailing in the air stream. The problems also include injuries and deaths resulting from unwanted movement of the head and helmet loss during the high wind blast conditions encountered during ejection. The wind blast conditions can reach speeds of 700 knots and dynamic pressures of up to 1660 pounds per square foot. With the increasing capabilities of high performance aircraft, the danger of such injuries and deaths is likely to increase rather than decrease.

Various devices for preventing limb flailing and helmet loss during high wind blast conditions have been proposed. One type of proposed device includes retractable straps which are connected to the legs by means of garters and to the arms by means of cuffs integrated into a special flight garment. When the crew member boards the aircraft, the straps must be manually attached by the crew member. Attaching the straps in the close confines of the cockpit, especially while wearing heavy winter flight clothing, is very difficult. In addition, in their slack unretracted position, the straps can be somewhat cumbersome, and there is the danger that the straps might become tangled with other hardware in the cockpit.

A number of other types of devices that have been proposed are essentially passive in that they do not require the active participation of the crew member in order to engage them. Such devices include net barriers that are deployed from the seat side panel and are intended to prevent the arms from being blown backward. A number of different types of face curtains have been suggested to prevent head gear loss and facial injury due to wind blast. Other proposed restraint devices include inflatable members that help to deploy net and strap members and also form barriers and limb capture means. Still other of the proposed devices are intended to provide protection by providing flow stagnation. These devices include side fences and head bonnets designed to reduce the high speed air flow around the extremities and the associated air loads on the body of the ejection seat occupant.

The devices that include straps that attach to the legs and arms and are retracted to restrain the legs and arms have proven to be effective in positively restraining limbs. However, they are subject to the problem of difficult engagement described above and the possibility of entanglement during emergency ground egress from the aircraft. Such entanglement could pose a very serious danger to the crew member. In general, the effectiveness of the passive systems has proved less positive. In addition, many of the passive systems require much more stowage volume and complex deployment systems than the strap devices. A final limitation of many known devices is that these devices tend to be related only to the arms, or the legs, or the head. This limitation to a particular portion of the body leads to a greatly increased complexity of the overall restraint system since separate devices are required to restrain each of the body portions.

Various devices employing a net as an arm restraint have been proposed. One such device is disclosed in U.S. Pat. No. 4,359,200, granted Nov. 16, 1982, to R. E. Brevard. In the Brevard device, restraining straps and two side nets are deployed by inflatable bladders adjacent to the shoulders and knees of the pilot. The two side nets are stowed in compartments on the sides of the seat that are closed by a "hook and eye" engagement of flaps. The inflation of the bladders opens the compartments, pulls the straps out into position, and moves the nets partially around the pilot. The deployment and detaching of the straps from the bladders is completed by a mechanism that retracts the straps through a snubber and by the action of the seat rising as the seat begins to eject.

U.S. Pat. No. 4,081,156, granted Mar. 28, 1978, to Willie Ake Ideskar discloses two triangular net-like arm restraining members for use during the ejection process. These net-like members are deployed to extend essentially vertically on either side of the seat. The members are stowed around a back shoulder portion of the seat. The members are deployed by retracting tension straps and tension bands. The tension straps are stowed in a slitted tube adjacent to the side of the seat.

U.S. Pat. No. 4,215,835, granted Aug. 5, 1980, to G. W. Wedgwood also discloses a net system for restraining arms during ejection from an aircraft. The two side nets are deployed by swing arms that throw the nets laterally outwardly to capture the elbows of the seat occupant. The swing arms then release the nets, which are pulled back in toward the center of the seat by the tensioning of center straps. In their final deployment position, the nets are generally vertical and only partially, at best, encircle the arms of the occupant. Before deployment, the nets are stowed in tubular housings, one on each side of the seat and one along each side of the seat back.

U.S. Pat. No. 3,214,117, granted Oct. 26, 1965, to E. L. James et al discloses an aircraft ejection seat with vertical restraining nets on either side to prevent arm flailing. These nets are described as being deployed by "any known means".

The patent literature also includes a number of examples of other devices for restraining parts of the body during ejection by the use of retractable straps or similar mechanisms. Such devices are disclosed in U.S. Pat. Nos. 2,955,786, granted Oct. 11, 1969, to R. D. Drew et al; 3,329,464, granted July 4, 1967, to A. J. Barwood et al; 3,957,231, granted May 18, 1976, to M. C. Miller et al; and 4,179,086, granted Dec. 18, 1979, to E. Y. Yamada. Rigid leg and arm restraints for an ejection seat are disclosed in U.S. Pat. No. 4,247,064, granted Jan. 27, 1981, to M. Schulman et al. Other restraint devices for use in aircraft are disclosed in U.S. Pat. Nos. 3,188,139, granted June 8, 1965, to W. C. Boyce;

3,249,385, granted May 3, 1966, to W. C. Boyce et al; 3,271,797, granted Sept. 13, 1966, to W. C. Boyce; 3,287,064, granted Nov. 22, 1966, to H. E. Freeman; and 3,302,633, granted Feb. 7, 1967, to H. C. Vykukal. U.S. Pat. No. 4,301,983, granted Nov. 24, 1981, to J. J. Horan discloses a seat structure for increasing g-load tolerance in an aircraft. The structure includes leg supports that pivot to bring the feet up and the knees against the chest, and a seat that rotates to place the person in a supine position.

The above discussion of known devices and patents and the prior art that is discussed and/or cited in the patents should be studied for the purpose of putting the present invention into proper perspective relative to the prior art.

DISCLOSURE OF THE INVENTION

A subject of the invention is a system in a flight vehicle for restraining movement of an occupant of an ejection seat during ejection. According to an aspect of the invention, the system comprises two shrouds located on opposite sides of the seat and strap means for pulling the shrouds around the occupant. The strap means includes a first portion positioned above and generally at the lateral center of the occupant's head, and a second portion positioned, before deployment, above and generally between the occupant's knees. Tensioning means tensions the strap means and pulls the second portion of the strap means aftwardly and downwardly between the occupant's legs.

Preferably, the first portion of the strap means is attached to the seat behind the occupant's head, and the system further comprises means for projecting such first portion horizontally forward above the occupant's head. Also preferably, the means for projecting includes an inflatable member that is carried by the seat and that extends horizontally forward as it inflates. In the preferred embodiment, the strap means extends across the top of the inflatable member and is connected to a forward edge portion of the inflatable member to cause the inflatable member to push downwardly on a helmet worn by the occupant when the strap means is tensioned.

A feature of the invention is the provision of stowage compartments for stowing the shrouds and an intermediate portion of the strap means. A stowage compartment extends along each side edge of the back of the seat and the top edge of the respective side of the seat.

Another feature of the invention is the provision of tension fuse means for engaging the second portion of the strap means and positioning it above and generally between the occupant's knees. This tension fuse means includes release means for releasing the second portion of the strap means when the strap means is tensioned a predetermined amount. This allows such second portion to drop between the knees of the occupant.

According to another aspect of the invention, the system further comprises knee strap means for exerting an aftward pressure on the shins of the occupant to pull the occupant's lower legs and feet into and hold them in an aft ejection position. Preferably, the knee strap means comprises two knee straps on opposite sides of the seat. Each such knee strap has a first end attached to a forward portion of the seat and a second end attached to the strap means for pulling the shrouds. In the preferred embodiment, the second end of each knee strap is positioned by tension fuse means, such as the means described above, forward of and above and generally between the occupant's knees. When the release means of the tension fuse means is activated to allow the second portion of the pull straps to drop, the knee straps also drop. The knee straps drop downwardly in front of the shins of the occupant.

Another subject of the invention is a method of restraining movement of an occupant of a flight vehicle ejection seat during ejection. According to an aspect of the invention, the method comprises providing two shrouds and attaching a first edge of each shroud to opposite sides of the seat. Two pull straps are also provided, and each strap is attached to a second edge of a different one of the two shrouds. A first portion of each strap is projected horizontally forwardly above the lateral center of the occupant's head to pull a top portion of each shroud laterally inwardly around the occupant. A second portion of each strap is positioned above and generally between the occupant's knees. The two straps are tensioned to pull the shrouds to the center of the seat all the way around the occupant. The second portion of each strap is allowed to drop down between the knees of the occupant.

According to another aspect of the method of the invention, the method further comprises providing a knee strap on each side of the seat. One end of each knee strap is attached to a forward portion of the seat. A second end of each knee strap is attached to one of the pull straps. The tensioning of the pull straps is allowed to pull the second end of each knee strap forward of and above and generally between the occupant's knees. Then the knee straps are allowed to drop, as the second portion of each pull strap drops, in front of the shins of the occupant. Then the pull straps are further tensioned to cause the knee straps to exert an aftward pressure of the shins of the occupant to pull the occupant's lower legs and feet into an aft ejection position.

The method and apparatus of the invention provide a reliable and economical system for restraining movement of an occupant of an ejection seat during ejection, to effectively prevent injury of such occupant caused by flailing of the limbs of the occupant and loss of the occupant's helmet. The apparatus of the invention is relatively easy and inexpensive to manufacture, install and maintain. In addition, the apparatus is very lightweight and requires very little stowage space in the aircraft cockpit. Both of these characteristics are highly advantageous in an aircraft environment. The restraint apparatus is deployed essentially automatically, without any need for the active participation of the occupant of the seat. The occupant need not at any time take any action at all to connect himself to the restraint system or to activate the restraint system. Thus, the system is as convenient as possible, and its deployment is relatively immune from human error.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 5 is like FIG. 4 except that it shows the apparatus of the invention fully deployed.

FIG. 6 is a front elevational view of the crew member and ejection seat shown in FIG. 5.

FIG. 7 is a sectional view taken along the line 7—7 in FIG. 2.

FIG. 8 is like FIG. 7 except that it shows the net partially removed from the tubular stowage compartment.

FIG. 9 is a front elevational view of the instrument panel in the aircraft cockpit shown in FIGS. 2, 4, and 5.

BEST MODE FOR CARRYING OUT THE INVENTION

Figure 1:
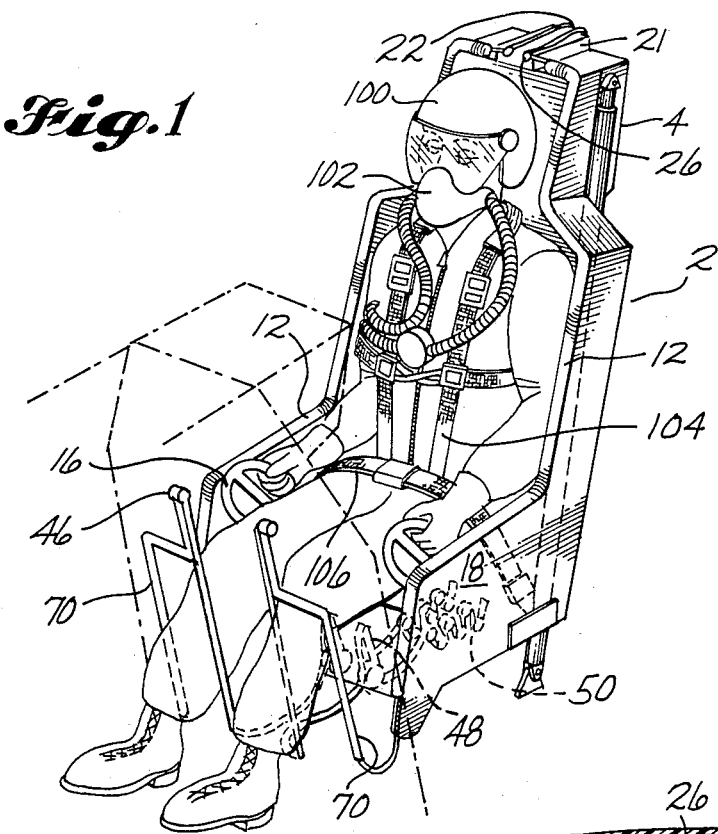
FIG. 1 is a pictorial view of a crew member seated in an ejection seat into which is incorporated the preferred embodiment of the apparatus of the invention prior to the initiation of deployment of such apparatus.
Figure 2:
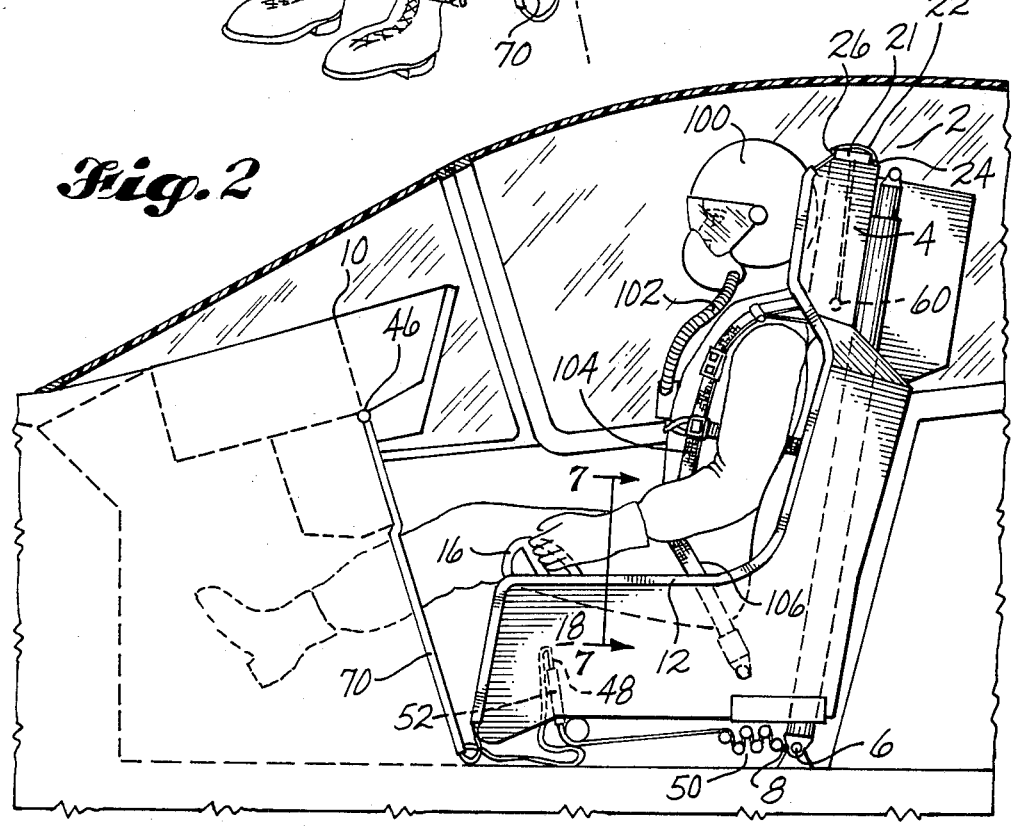
FIG. 2 is a side elevational view of the crew member, ejection seat, and apparatus shown in FIG. 1.

The drawings show a restraint system that is constructed according to the invention and that also constitutes the best mode of the invention currently known to the applicant. The drawings also illustrate the best mode for carrying out the method of the invention currently known to the applicant. In the drawings, the apparatus of the invention is shown installed in an aircraft cockpit having an ejection seat 2 and an instrument panel 10. Most of the details of construction of the seat 2 and instrument panel 10 form no part of the present invention and will not be discussed herein. It is course to be understood that the apparatus and method of the invention may be used to great advantage in various flight vehicle environments and that the method and apparatus of the invention are not limited to use in a cockpit of the type shown in the drawings.

In the drawings, a crew member is shown seated in the ejection seat 2. The crew member's head is adjacent to and forward of a head rest 4 that is part of the seat 2. The seat 2 is attached to the floor of the cockpit at an attachment point 6. Ejection initiation handle grips 16 are provided for the crew member to grasp to aid him in retaining his position in the ejection seat 2 whether or not the restraint apparatus is deployed. The crew member is wearing a helmet 100, oxygen equipment 102, a harness 104, and a lap belt 106.

The preferred embodiment of the apparatus shown in the drawings includes an inflatable member 20 that, when not deployed, is stored in a compartment 21 attached to the top of the headrest 4. The member 20 has a rectangular shape, and its surfaces are substantially flat. The member 20 may be made from any of a variety of known materials. An example of a suitable material is polyurethane coated rubberized nylon. The member 20 preferably includes internal threads that connect the top and bottom walls of the member 20 in order to maintain the configuration of the member 20 upon inflation. The member 20 is deployed forwardly and horizontally outwardly from the compartment 21. A pyrotechnic gas generator 60 inflates the member 20, and the inflating of the member 20 automatically moves it out of the compartment 21.

The preferred embodiment of the apparatus also includes two center straps 22, one corresponding to each side of the seat 2. Each of the straps 22 has an upper end that is connected to an upper rear location 24 on the head rest 4. The strap extends from location 24 forwardly across the top of compartment 21 and through a ring fitting 26 carried by the forward top edge of inflatable member 20. From the ring fitting 26, the strap 22, in its stowed condition, extends laterally outwardly toward its respective side of the seat 2 and into a tubular stowage compartment 12. This compartment 12 and the stowed strap 22 therein runs laterally outwardly across the front edge of the top of the head rest 4, down the foward side edge of the head rest 4, around to and down the forward side edge of the back of the seat 2, forwardly across the upper edge of the side panel 18 of the seat 2, and finally down the front edge of the side panel 18. At the bottom of the side panel 18, the strap 22 leaves the compartment 12, drops down to the floor of the cockpit, and extends across the floor a short distance to the instrument panel 10.

When it reaches the instrument panel 10, the strap 22 extends upwardly into a second tubular compartment 70 mounted on the panel 10. The strap 22 then extends through the entire length of the tubular compartment 70. Referring to FIG. 9, the compartment 70 has a first substantially vertical portion 72 that extends upwardly along a forward portion of the panel 10 to the side of the ejection seat 2. At the top of portion 72, the compartment 70 bends into a generally horizontal portion 74 and moves laterally inwardly toward the center of the panel 10. At the laterally inner edge of the spaces for the crew member's legs, the compartment 70 makes another turn upwardly into a second vertical portion 76 that terminates at a tension fuse fitting 46, which may be of any of various known types. The strap 22 extends all the way through portions 72, 74, 76 and is engaged by the fuse fitting 46. The strap 22 then turns to again move downwardly through a tubular compartment 78 that runs along the front of the instrument panel 10 downwardly from the fuse fitting 46 to the floor of the cockpit. The strap 22 then extends rearwardly across the floor to a snubber 48 mounted to the lower part of the seat pan. The structure of snubber 48 and the manner in which it engages strap 22 may be varied considerably and may take a variety of known forms.

The preferred embodiment of the apparatus also includes two knee straps 40, one for each of the knees of the crew member. As shown in the drawings, the outer end of each strap 40 is attached to the side panel 18 of the seat 2 by a fastener 42. This fastener 42 may be of any of a variety of suitable types. The inner end of each knee strap 40 is connected to the corresponding center strap 22. When the restraint apparatus is in a stowed position, the knee straps 40 are stowed with the intermediate portions of straps 22 in their respective tubular compartments 12.

An important feature of the invention is a shroud that restrains the arms of the seat occupant during ejection from the aircraft. In the preferred embodiment shown in the drawings, the shroud takes the form of two side nets 28, one on each side of the ejection seat 2. The inner edge of each net 28 is attached along its length to the respective center strap 22. The laterally outer edge of each net 28 is attached to the side panel 18 of the seat 2 inside the respective compartment 12. Each net 28 includes reinforcing straps 30 and a triangular hand restraint portion 32. The nets 28 may be made from a variety of materials. An example of a material that is suitably lightweight and strong is a Kevlar netting material.

When the restraint apparatus is in its stowed position, each net 28 is stowed with the corresponding straps 22, 40 in the respective tubular compartment 12. FIG. 7 is a cross section of a portion of one of the compartments 12 showing the net 28 is its stowed position. The net 28 and its reinforcing straps 30 are entirely contained in the cavity 34 defined by the compartment 12. The inner edge of the net 28 is secured to the bottom wall of the compartment 12 and the side panel 18 by means of screw fasteners 36 which are spaced every few inches along the length of compartment 12.

The wall of compartment 12 facing inwardly toward the occupant of the seat is provided with a break that extends along the length of the compartment 12. This break in the continuity of the wall of the compartment 12 is defined by two interlocking edges 38 of the wall. When an outward force is exerted on the center strap 22, these interlocking edges 38 readily separate to open the compartment 12 and allow the straps 22, 30, 40 and the net 28 to be withdrawn from the compartment 12. FIG. 8 shows the interlocking edges 38 separated and the net 28 moving out of the compartment 12. The reinforcing straps 30, in addition to being attached to the net 28, have their laterally outer ends secured to the side panel 18 by fasteners 44 similar to the fasteners 42 that secure the knee straps 40.

The operation of the restraint system of the invention is relatively simple and highly reliable. The ejection process is triggered in a known manner. Upon the triggering of the ejection procedure, the pyrotechnic gas generator 60 is activated to deploy the inflatable member 20. As the inflatable member 20 moves forwardly, the center straps 22 slide through ring fittings 26 and the member 20 pulls the upper portions of the center straps 22 and nets 28 out of the compartment 12. The forward pulling force on the straps 22 is sufficient to pop open the compartment 12 and separate the interlocking edges 38. The top portions of straps 22, by means of their engagement in ring fittings 26, are projected forwardly above the helmet of the seat occupant. This causes the upper portions of straps 22 and nets 28 to move toward the lateral center of the seat 2 and around the occupant.

The straps 22 are retracted in a direction toward the snubbers 48. The retraction of the straps 22 may be accomplished by a number of means. The preferred means is to allow the straps to be automatically pulled by the upward motion of the ejection seat 2. This method is relatively passive and, thus, is less subject to failure than most devices that actively retract straps. The use of the preferred passive method creates a need for a pulley mechanism like that shown in the drawings and best seen in FIG. 5. The pulley mechanism 50 shown in FIG. 5 includes a plurality of pulleys and number of turns of the strap 22 so that the upward movement of the seat 2 will be multiplied a number of times to retract the straps 22 a distance several times the distance that the seat 2 rises.

Figure 3:
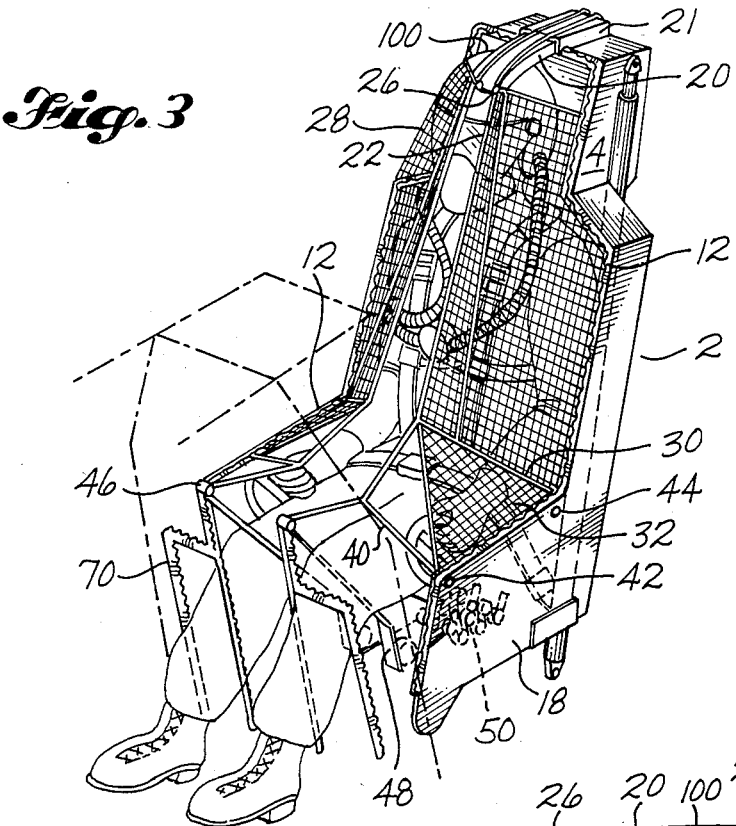
FIG. 3 is a pictorial view that is like FIG. 1 except that it shows the preferred embodiment of the restraint apparatus of the invention is a partially deployed position.
Figure 4:
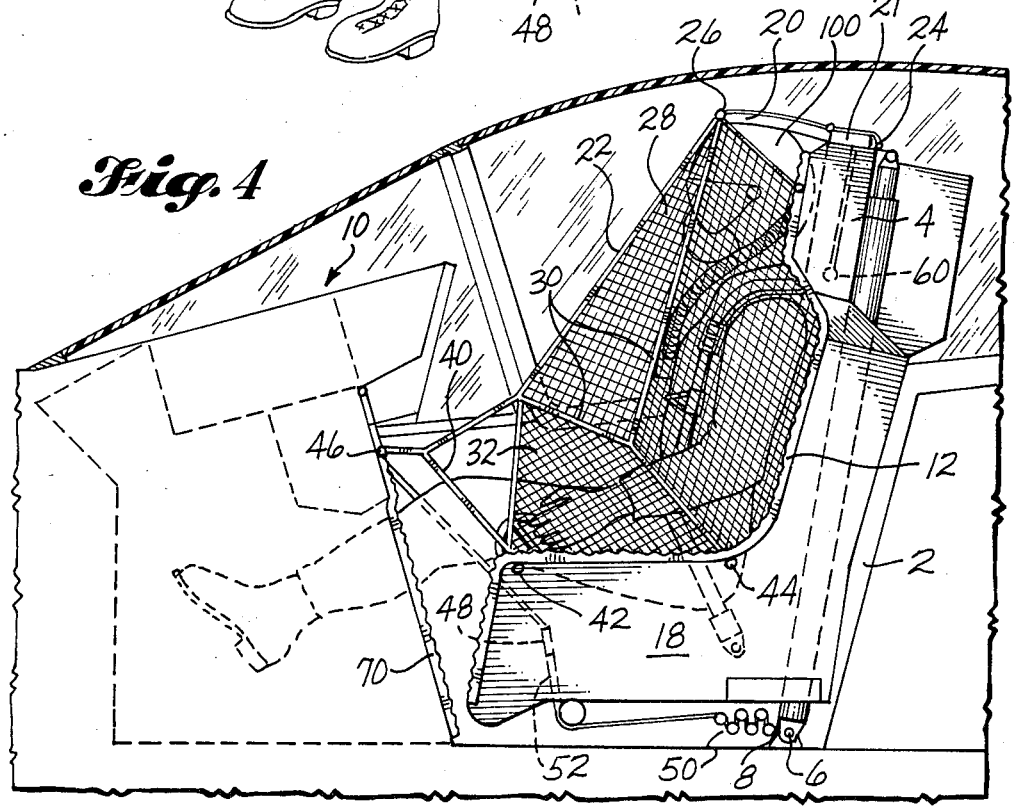
FIG. 4 is a side elevational view of the crew member and apparatus shown in FIG. 3.

The retraction of the straps 22 causes the straps 22, 30, 40 and the nets 28 to be progressively drawn out of the tubular compartment 12 on the seat 2 and (in the case of straps 22) the tubular compartments 70, 78 on the instrument panel 10. The nets 28 and straps 22 are shown in a partially deployed condition in FIGS. 3 and 4.

The tension fuse fittings 46 guide the straps 22 and nets 28 laterally inwardly around the torso of the seat occupant. The portion of the strap 22 just below the bottom of the corresponding net 28 is guided above and generally between the knees of the seat occupant. When the straps 22 have been completely removed from the compartments 12, 70, 78, and when the tension increases to a predetermined amount, the fuse fittings 46 automatically release the straps 22, which drop down between the knees of the seat occupant. When the straps 22 drop down between the knees of the occupant, the knee straps 40 drop down in front of the knees of the occupant. The further tensioning of the straps 22 by the upward movement of the ejection seat 2 pulls the straps 22 into their fully deployed generally vertical positions shown in FIGS. 5 and 6. It also pulls knee straps 40 aftwardly against the shins of the seat occupant. This in turn pulls the occupant's lower legs and feet aftwardly into the ejection position shown in FIGS. 5 and 6, and holds them there. As the straps 22 are tightened, the snubbers 48 engage the straps 22 and prevent them from moving away from their increasingly tensioned portion in a well-known manner. When the straps 22 have reached a predetermined fully deployed tension, they are cut by a strap cutter. The strap cutter may take any of a variety of known forms and may be located anywhere downstream of the snubbers 48. In the preferred embodiment shown in the drawings, strap cutters 52 are shown positioned just below the respective snubbers 48. This positioning has the advantage of not leaving any strap end dangling below the seat 2. The cutting of the straps 22 frees the restraint apparatus from its aircraft anchor point 8.

In its fully deployed condition shown in FIGS. 5 and 6, the restraint apparatus restrains the arms, the legs, and the head of the seat occupant. This is all accomplished with relatively simple restraint apparatus that is deployed in one operation. The head of the occupant is restrained by the upper portions of the nets 28 and by the downward force of the inflatable member 20, which is urged downwardly by the tension of the straps 22. The pressure of inflatable member 20 against the helmet 100 of the occupant also serves to prevent loss of the helmet 100 during the ejection process regardless of the occupant's height. The arms of the occupant are restrained by the portion of the nets 28 below the head, which encircle the torso of the occupant, and by the reinforcing straps 30 of the nets 28. The triangular portions 32 of the nets 28 restrain the hands of the occupant. The legs of the occupant are restrained by the knee straps 40 which are pulled tight around the front of the occupant's lower legs between the knees and feet.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the invention as defined by the following claims.

What is claimed is:

1. In a flight vehicle, a system for restraining movement of an occupant of an ejection seat during ejection, said system comprising:

two shrouds located on opposite sides of the seat, each such shroud being attached to its respective side of the seat and having a stowed position along said respective side;

strap means for pulling the shrouds out of their stowed positions laterally inwardly around the occupant; said strap means including a first portion positioned above and generally at the lateral center of the occupant's head, a second portion having a stowed position above and generally between the occupant's knees, and an intermediate portion attached to the shrouds; and tensioning means for tensioning the strap means to pull the shrouds around the occupant and said second portion aftwardly and downwardly between the occupant's legs.

2. A system as described in claim 1, in which said first portion of the strap means is attached to the seat behind the occupant's head; and which further comprises means for projecting said first portion horizontally forwardly above the occupant's head to pull an upper portion of each shroud laterally inwardly around the occupant's head.

3. A system as described in claim 2, in which said means for projecting includes an inflatable member that is carried by the seat and that extends horizontally forwardly above the lateral center of the occupant's head as it inflates.

4. A system as described in claim 3, in which the strap means extends across the top of the inflatable member and is connected to a forward edge portion of the inflatable member to cause the inflatable member to push downwardly on a helmet worn by the occupant when the strap means is tensioned.

5. A system as described in claim 1, further comprising first stowage means extending along the side and top edges of the seat for stowing the shrouds and said intermediate portion of the strap means, and second stowage means located forward of the seat for stowing a lower portion of the strap means that includes said second portion.

6. A system as described in claim 5, further comprising tension fuse means for positioning said second portion of the strap means in its stowed position and for slidingly engaging said lower portion and guiding it above and generally between the occupant's knees when the strap means is tensioned, said tension fuse means including release means for releasing said lower portion when the strap means is tensioned a predetermined amount to allow said lower portion to drop between the knees of the occupant.

7. A system as described in claim 6, in which said first portion of the strap means is attached to the seat behind the occupant's head; and which further comprises means for projecting said first portion horizontally forwardly above the occupant's head to pull an upper portion of each shroud laterally inwardly around the occupant's head.

8. A system as described in claim 7, in which said means for projecting includes an inflatable member that is carried by the seat and that extends horizontally forwardly above the lateral center of the occupant's head as it inflates.

9. A system as described in claim 8, in which the strap means extends across the top of the inflatable member and is connected to a forward edge portion of the inflatable member to cause the inflatable member to push downwardly on a helmet worn by the occupant when the strap means is tensioned.

10. A system as described in claim 1, further comprising a knee strap on each side of the seat for exerting an aftward pressure on the shins of the occupant to pull the occupant's lower legs and feet into and hold them in an aft ejection position; each such knee strap having a first end attached to a forward portion of the seat, and a second end attached to the strap means.

11. A system as described in claim 10, further comprising tension fuse means for positioning said second portion of the strap means in its stowed position and, when the strap means is tensioned, for slidingly engaging a lower portion of the strap means and guiding it above and generally between the occupant's knees and positioning said second end of each knee strap forward of and above and generally between the occupant's knees; said tension fuse means including release means for releasing said lower portion when the strap means is tensioned a predetermined amount, to allow said lower portion to drop between the knees of the occupant and the knee straps to drop downwardly in front of the shins of the occupant.

12. A system as described in claim 10, in which said first portion of the strap means is attached to the seat behind the occupant's head; which further comprises an inflatable member that extends horizontally forwardly above the lateral center of the occupant's head as it inflates, to project said first portion horizontally forwardly above the occupant's head to pull an upper portion of each shroud laterally inwardly around the occupant's head; and in which the strap means extends across the top of the inflatable member and is connected to a forward edge portion of the inflatable member to cause the inflatable member to push downwardly on a helmet worn by the occupant when the strap means is tensioned.

13. A method of restraining movement of an occupant of a flight vehicle ejection seat during ejection, said method comprising:

providing a shroud on each side of the seat, and attaching a first edge of each shroud to its respective side of the seat;

providing two pull straps and attaching an intermediate portion of each such strap to a second edge of a different one of the two shrouds;

stowing each shroud, with the attached intermediate portion, along its respective side of the seat;

projecting an upper portion of each strap horizontally forwardly above the lateral center of the occupant's head to pull a top portion of each shroud laterally inwardly around the occupant;

positioning a lower portion of each strap above and generally between the occupant's knees;

tensioning the two straps to pull the shrouds to the center of the seat all the way around the occupant; and allowing said lower portion of each strap to drop down between the knees of the occupant.

14. A method as described in claim 13, further comprising providing a knee strap on each side of the seat; attaching one end of each knee strap to a forward portion of the seat; attaching a second end of each knee strap to one of the pull straps; allowing the tensioning of the pull straps to pull said second end of each knee strap forward of and above and generally between the occupant's knees; then allowing the knee straps to drop, as the lower portion of each pull strap drops, in front of the shins of the occupant; and then further tensioning the pull straps to cause the knee straps to exert an aftward pressure on the shins of the occupant to pull the occupant's lower legs and feet into an aft ejection position.

15. A method as described in claim 13, in which positioning said lower portion comprises stowing said lower portion in a stowed position in which the strap extends through a fitting forward of and above and generally between the occupant's knees; in which tensioning the strap includes allowing it to slide through said fitting;

and in which allowing said lower portion to drop includes allowing a predetermined amount of tension in the strap to pull the strap free of said fitting.

16. A method as described in claim 15, further comprising providing a knee strap on each side of the seat; attaching one end of each knee strap to a forward portion of the seat; attaching a second end of each knee strap to one of the pull straps; allowing the tensioning of the pull straps to pull said second end of each knee strap forward of and above and generally between the occupant's knees; then allowing the knee straps to drop, as the lower portion of each pull strap drops, in front of the shins of the occupant; and then further tensioning the pull straps to cause the knee straps to exert an aftward pressure on the shins of the occupant to pull the occupant's lower legs and feet into an aft ejection position.

17. In a flight vehicle, a system for restraining movement of an occupant of an ejection seat during ejection, said system comprising:

a shroud on each side of the seat; said shroud having a first edge attached to a laterally outer portion of the seat, and a second edge;

strap means for pulling the shrouds around the occupant; said strap means including an upper portion attached to the seat behind the occupant's head, a lower portion attached to the seat below and generally between the occupant's knees, and an intermediate portion between said upper and lower portions and attached to said second edge of each shroud;

tensioning means for pulling said lower portion to tension the strap means;

stowage means for stowing the shrouds and said intermediate portion of the strap means along a laterally outer portion of the seat;

an inflatable member that is carried by the seat and that extends horizontally forward as it inflates to project said upper portion horizontally forward above the occupant's head and pull upper portions of said shrouds toward the lateral center of the seat and around the occupant; said upper portion of the strap means extending across the top of the inflatable member and being connected to a forward edge portion of the inflatable member to cause the inflatable member to push downwardly on a helmet worn by the occupant when the strap means is tensioned;

a knee strap on each side of the seat for exerting an aftward pressure on the shins of the occupant to pull the occupant's lower legs and feet into and hold them in an aft ejection position; each such knee strap having a first end attached to a forward portion of the seat, and a second end attached to said lower portion of the strap means; and tension fuse means for slidingly engaging said lower portion, for positioning a part of said lower portion forward of and above and generally between the occupant's knees when the strap means is in a stowed position, and for guiding said second end of each knee strap forward of and above and generally between the occupant's knees when the strap means is tensioned; said tension fuse means including release means for releasing said lower portion when the strap means is tensioned a predetermined amount, to allow said lower portion to drop between the knees of the occupant and the knee straps to drop downwardly in front of the shins of the occupant.

* * * * *